(No Model.)
L. J. H. VINSON.
SCREW.
No. 481,445. Patented Aug. 23, 1892.
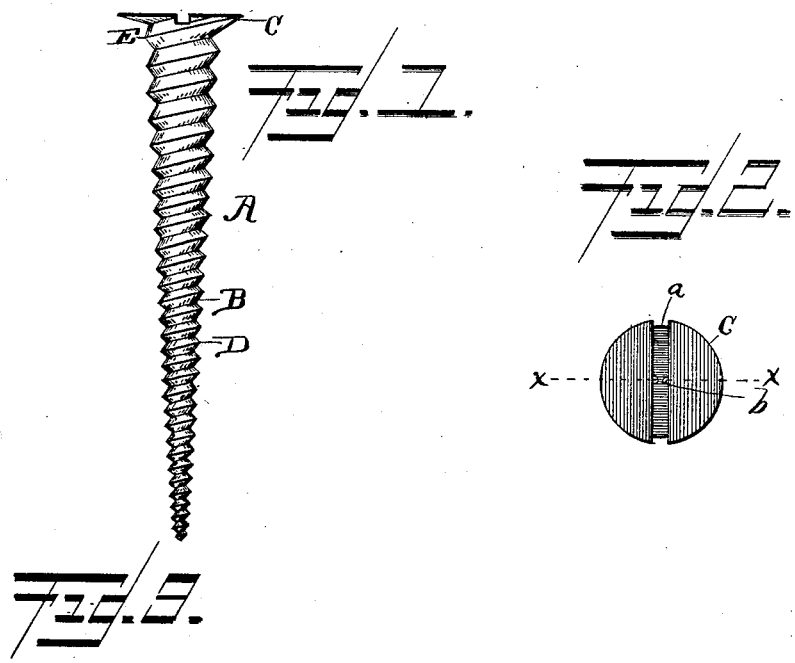
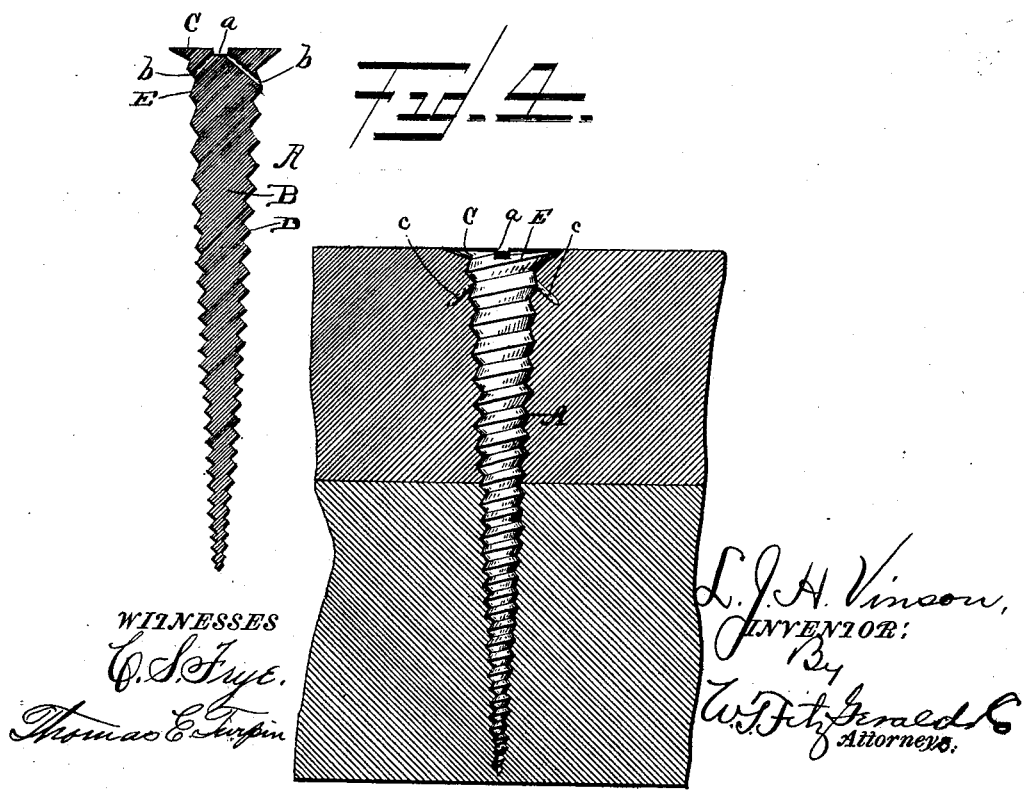
WITNESSES
C. S. Frye
Thomas E. Turpin
L. J. H. Vinson,
INVENTOR:
By W. T. Fitzgerald
Attorneys.

UNITED STATES PATENT OFFICE.

LEAVEN J. H. VINSON, OF TITUSVILLE, FLORIDA.

SCREW.

SPECIFICATION forming part of Letters Patent No. 481,445, dated August 23, 1892.

Application filed February 23, 1892. Serial No. 422,520. (No model.)

*To all whom it may concern:*

Be it known that I, LEAVEN J. H. VINSON, a citizen of the United States, residing at Titusville, in the county of Brevard and State of Florida, have invented certain new and useful Improvements in Screws; and I do hereby declare the following to be a full, clear, and exact description of the invention, such as will enable others skilled in the art to which it appertains to make and use the same.

My invention has relation to improvements in screws; and it consists in the construction and arrangement of parts, as will be hereinafter described, and particularly pointed out in the claim.

In the accompanying drawings, Figure 1 is an elevation of my improved screw. Fig. 2 is a top plan view of the same. Fig. 3 is a longitudinal diametrical section of the screw, taken in the plane indicated by the line $x$ $x$ on Fig. 2; and Fig. 4 is an elevation of the screw securing two pieces of wood together, the said wood being shown in section.

In the said drawings similar letters designate corresponding parts throughout the several views, referring to which—

A indicates my improved screw, which comprises the shank B and the head C, both of which may be of the ordinary or any approved general form.

Formed upon the shank B, which is preferably tapered toward its free end, are threads D, which merge at their upper ends into the threads E upon the head C, which threads extend to the top of the said head, whereby it will be readily perceived that the screw is threaded throughout its entire length. By reason of the threads D and E extending the entire length of the screw, it will be readily perceived that the said screw will render more effective service than screws of greater length having one-third of their length plain, inasmuch as the entire length of the screw engages the wood and does not necessitate the boring of a hole greater than the length of its threads, whereby it will be perceived that the liability of straining or splitting the wood is reduced to a minimum. For instance, in fastening two one-inch boards together, when the ordinary screws one and one-fourth or one and one-half inches long are employed there will not be more than one-half inch of threads in engagement with the boards, whereas when one of my improved screws one inch in length is employed there will be one inch of threads in engagement with the boards, whereby it will be readily perceived that a much stronger and durable connection is effected.

From the foregoing description it will be apparent that I have provided a screw capable of serving more effectually than the ordinary screw one and one-half times its length, whereby it will be obvious that in the manufacture of a large number of screws a great saving in material is accomplished.

Formed in the head C of the screw, and extending from the center of the diametrical slot $a$ in the top thereof to diametrical points in the side of said heads, are laterally-oblique holes $b$ for the passage of the locking-pin, said pin being formed of a single piece of metal, preferably wire, which is bent at its middle portion, so as to form on opposite sides thereof limbs $c$ $c$, which enter the holes $b$, the said bend resting in the slot in the head of the screw.

From the foregoing description, taken in conjunction with the accompanying drawings, it will be readily perceived that I have provided an exceedingly simple and efficient screw and one which may be manufactured at a less cost than screws of the ordinary form.

Although I have specifically described the construction and relative arrangement of the several elements of my improved screw, yet I do not desire to be confined to the same, as such changes or modifications may be made as fairly fall within the scope of my invention.

Having thus described my invention, what I claim, and desire to secure by Letters Patent, is—

A screw having a shank with continuous threads thereon, including the head, and oblique openings in opposite sides of the head, opening at their upper ends in the slot of the head, in combination with a locking-pin with limbs adapted to enter said opening and extend beyond the sides of the head, the bend of the locking-pin resting in the slot of the head, substantially as and for the purposes specified.

In testimony whereof I affix my signature in presence of two witnesses.

LEAVEN J. H. VINSON.

Witnesses:
J. TOME REYNOLDS,
HENRY B. ARCHIBALD.